Aug. 7, 1956
C. H. LUHRS
2,758,282
TRANSFORMING MICRO WAVE ENERGY FROM
RECTANGULAR AIR FILLED WAVE GUIDE
Filed March 28, 1952
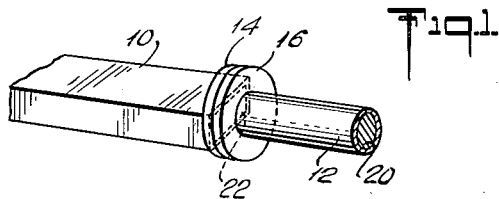
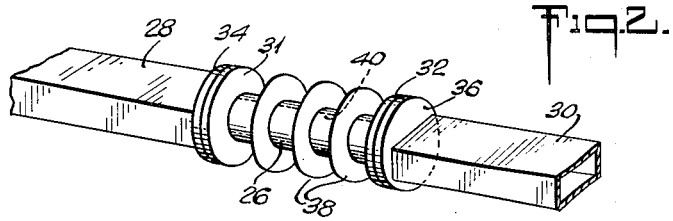
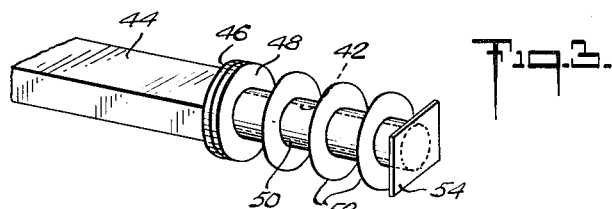
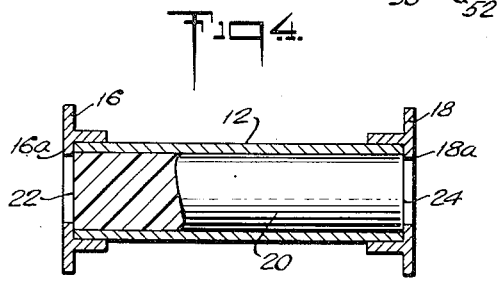 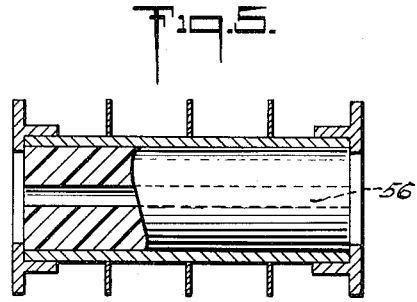
 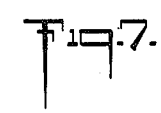
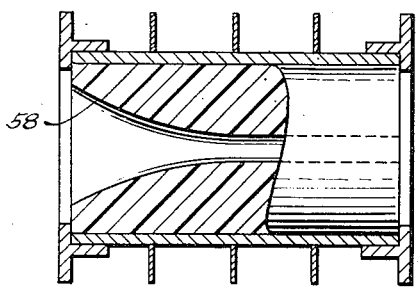
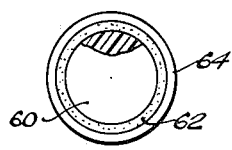
INVENTOR.
CHARLES H. LUHRS
BY
Hoag, Kilburn & Carlson
ATTORNEYS.

United States Patent Office 2,758,282
Patented Aug. 7, 1956

2,758,282

TRANSFORMING MICROWAVE ENERGY FROM RECTANGULAR AIR FILLED WAVE GUIDE

Charles H. Luhrs, Teaneck, N. J., assignor to General Precision Laboratory Incorporated, a corporation of New York Application March 28, 1952, Serial No. 279,147

4 Claims. (Cl. 333—21)

This invention relates to method and means for transforming micro wave energy from rectangular air filled wave guide. Devices embodying the invention may be used in a variety of ways as for example: (1) a mode transformer for transforming micro wave energy from the dominant mode in the rectangular wave guide to the dominant mode in a circular wave guide; (2) an attenuator, or (3) a termination member.

Heretofore for a simple mode transformer, for transforming micro wave energy from a rectangular wave guide into a circular wave guide or vice versa, it has been customary to use an interconnecting wave guide section the cross sectional geometry of which gradually changes from rectangular to round; for attenuating energy in a wave guide it has been customary to use a tapered or stepped dielectric body; and for terminating a wave guide it has also been customary to insert within the wave guide a tapered dielectric body, and to close the wave guide beyond the said tapered body. It has not been heretofore known that a round wave guide could be used to terminate a rectangular wave guide directly, over an appreciable frequency band with very little mismatch, or that wave energy in a rectangular wave guide system may be attenuated with very little impedance mismatch by inserting a length of round wave guide therein.

Forming the tapered body or the wave guide section gradually changing from rectangular to round are difficult and time consuming operations. In performing them a number of different kinds of machines are required and it is uncertain until each device is completed and tested whether the taper, or the section changing gradually in cross sectional form, or both, will give a satisfactory match. Thus there is a high degree of expense for both labor and machinery and the expense is increased by waste of labor and material.

Prior art devices of this kind have been unsatisfactory for the further reason that the taper of the dielectric body and the wave guide section changing gradually from rectangular to round in cross section, are each easily damaged and even very slight blows will cause mismatch thus rendering the members useless. The long tapered ends characteristic of the dielectric bodies of such prior art devices are very likely to be broken if dropped, or by inadvertent blows received either in use or when not in use, and can usually not be repaired, and once the symmetry of the said wave guide section (gradually changing from rectangular to round) of complicated cross sectional geometry has been destroyed it is usually impossible to repair it.

The prior art devices have the further disadvantage of being long, bulky and heavy due to the taper and said section of wave guide gradually changing from rectangular to round.

Accordingly it is an object of this invention to provide a simple, compact and shock-proof device of the above mentioned kind.

Another object of the invention is to provide such a device which may be made with a minimum of labor and machinery.

Another object of the invention is to provide such devices which may be made with a minimum of waste.

Another object of the invention is to provide such devices well adapted for volume production.

Another object of the invention is to provide devices of the above described kind which can be made up from parts manufactured in advance and which can be readily assembled with the assurance of providing a satisfactory match.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a perspective view of one embodiment of the invention;

Figure 2 is a perspective view of a slightly modified embodiment of the invention;

Figure 3 is a perspective view of a third embodiment of the invention;

Figure 4 is a front elevation of a longitudinal cross section taken on the line 4—4 of Figure 1;

Figure 5 is a view similar to Figure 4 but showing the body of dielectric material modified by the provision of a central bore;

Figure 6 is a view similar to Figure 5 but showing the body of dielectric material provided with a bore of modified cross section; and Figure 7 is an end view of another embodiment of the invention.

I have found that micro wave energy may be transmitted directly from rectangular air filled wave guide into a circular wave guide having therein a cylindrical body of dielectric material characterized by having plane ends. Depending upon the dielectric material selected I have obtained very satisfactory results with such an article for transforming micro wave energy from the dominant mode in a rectangular wave guide to the dominant mode in a circular wave guide; for attenuating micro wave energy; and for providing a termination for a length of air filled rectangular wave guide.

For any of these uses I employ a cylinder of dielectric material having a diameter approaching that of the diameter of the circular wave guide, so that the cylinder of dielectric material substantially fills a cross section of the circular wave guide in which it is contained.

I bring a plane end of the dielectric body to, or substantially to, the end of a circular wave guide which is coupled to a length of air filled rectangular wave guide. If the circular wave guide is interconnected between two lengths of air filled rectangular wave guide, as for example when used as an attenuator, the cylinder of dielectric will be coextensive with the circular wave guide and its respective plane ends will extend to the respective ends of the circular wave guide.

The cylindrical body of dielectric material may be formed from any of a wide variety of materials one important factor determining the material selected being the use desired of the device. If a simple mode transformer is desired a substantially lossless dielectric material is desirable. I have obtained very good results using polytetrafluoroethylene, available commercially under the trade name "Teflon," and polystyrene. If the device is to be used as an attenuator a lossy material is desirable capable of absorbing a portion of the wave energy and dissipating it in the form of heat. I have obtained very good results using a cylindrical dielectric body of wood, such for example as birch or ash. The moisture content of wood, however, is variable and a material having little variation in moisture content such for example as polytetrafluoroethylene loaded with carbon or some similar dissipative material, may be preferred. Any of a variety of other materials may be selected the choice depending in large part upon the degree of attenuation desired. For use as a termination member known dielectric materials such for example as cement, transite, graphite and silica, may be used.

In Figure 1 I have shown an embodiment of the invention for transferring energy from the dominant mode in rectangular wave guide to the dominant mode in circular wave guide. As shown therein a length of air filled rectangular wave guide 10 of standard size is longitudinally aligned with and directly coupled to a length of round wave guide 12, as by coupling flange 14 at the adjacent end of the rectangular wave guide and the circular coupling flange 16 at the end of the circular wave guide 12 which is in abutting relation to said rectangular wave guide. About two inches of circular wave guide is shown and it is then cut off indicating that its length is not important to its mode changing function. Its length may vary according to its use. Within said circular wave guide 12 is a cylindrical body of dielectric material 20, preferably polytetrafluoroethylene or polystyrene, with one plane end 22 shown and disposed substantially normal to the longitudinal axis of said wave guide 12, said plane end extending substantially to the respective end of section 12, which is in abutting relation to the rectangular wave guide. Said dielectric body is of a diameter approaching the diameter of the section 12 so that it substantially fills said section in cross section as well as longitudinally.

In Figure 2 the invention is embodied as an attenuator. The length of round wave guide 26 is interconnected between the longitudinally aligned rectangular wave guides 28 and 30. The round wave guide has thereon at its respective ends the end flanges 31 and 32 coupled to the flanges 34 and 36 at the abutting ends of said rectangular wave guides respectively, and the heat dissipating fins 38. Within said round wave guide is a cylindrical body 40 of suitable dielectric material to absorb and transfer into heat a desired portion of the energy entering said round wave guide 26.

In Figure 3 the invention is embodied as a termination. The length of circular wave guide 42 is coupled to the end of an air filled rectangular wave guide 44, as by flange 46 at the end of the rectangular section and the circular flange 48 at the abutting end of the circular section 42. The round wave guide has therein a cylinder of dielectric material 50 which may be the same material selected for use in the device as an attenuator or may have a higher or lower loss factor depending upon the amount of power propagated in rectangular section 44, which is to be dissipated. Around the circular section the circular heat dissipating fins 52 are provided. The structure shown in Figure 3 differs from that shown in Figure 2 principally by the provision of a closing plate 54 at the end of the round section which is remote from the rectangular wave guide being terminated. Closing one end of section 42 may be accomplished in any suitable known way. I have obtained very satisfactory results using a metal plate 54 of a thickness on the order of 1/32 of an inch.

I have found that when a dielectric cylinder of substantial density is employed i. e. having a high dielectric constant—improved results are obtained by spacing a cylinder end which is in abutting relation to the end of a rectangular wave guide a very small distance from the rectangular wave guide and therefore a very small distance from the end of the circular wave guide in which it is contained and which is in abutting relation to the rectangular wave guide as is illustrated in Figures 4, 5 and 6, such very small distance being on the order of from 1/1000 to 1/32 of an inch. For high power work I prefer to use a round wave guide the diameter of which is 3/4 of an inch or more. I have obtained good results using a round wave guide the diameter of which is within a range of from 3/4 of an inch to 2 inches, and employing a cylinder of dielectric of a cross sectional diameter to substantially fill said wave guide. For a low power termination member I prefer to use a length of circular wave guide having a diameter on the order of 3/4 of an inch.

When a substantially lossless dielectric material is used, as for example for effecting simple mode transformation, it is desirable to form the circular wave guide from a good conductive material, such, for example, as copper or brass. Where a lossy dielectric material is employed, as for example for an attenuator or a termination member, it is desirable to make the round wave guide section of material which is less conductive, such, for example, as iron.

In Figure 4 I have shown a longitudinal section of a round wave guide having therein a round cylinder of dielectric material with plane ends, suitable for use as a simple mode transformer or for low power work in general. The round section shown in Figure 1 could be completed as shown in Figure 4 and the numerals used are those used in connection with Figure 1 with the added end flange identified by numeral 18 and the end of the cylinder made substantially coextensive with said end flange is identified by the numeral 24. It will be noted that I have shown the end flanges 16 and 18 extending inwardly to provide the angular portions 16ª and 18ª overlapping peripheral portions of the end faces 22 and 24 respectively of the cylinder of dielectric 20. This or any other suitable means may be employed for securing the dielectric body within the round wave guide.

I have found that for high power work it may be desirable, both for spreading the heat dissipating action of the dielectric body longitudinally of said body, and for better absorption of reflected waves which have a tendency to modify waves being propagated, to provide a central bore 56 axially through the cylinder of dielectric material, as shown in Figure 5. Preferably the bore 56 is of uniform diameter throughout and may thus be readily formed. In some instances, however, it may be desirable to expand said central bore, at least throughout a portion of its length, with a female taper as indicated at 58 in Figure 6. I have noted that where ferrite is used as the dielectric material the dissipative effect of the dielectric is in inverse proportion to the temperature rise within the dielectric. It is thus desirable to decrease the effective area of the cylinder of dielectric at the end thereof receiving energy and prevent concentration of the dissipative action within this end of the cylinder and thus modify the temperature rise within this portion of said cylinder by spreading the dissipative action longitudinally of the electric body.

It will be noted that all of the operations necessary to form the parts shown in Figures 1 to 6 inclusive are simple turning operations and can all be performed on a lathe. The ends of the round wave guide and cylindrical dielectric body are formed by simple cut-off operations and these are also turning operations. No milling is required whereas the prior art structures require milling on four surfaces plus chamfering of the sides. From this it will be appreciated that long lengths of round wave guide and long lengths of cylindrical dielectric material may be kept on hand and simply cut to the desired length and assembled to provide the device as illustrated in Figures 1–6.

Thus the laborious, expensive and time consuming operations of forming wave guide sections gradually changing from rectangular to circular cross section may be entirely eliminated thereby effecting substantial economics in time, labor and material, and substantial further economies are effected by eliminating the difficult operation of forming a taper at the same time removing the uncertainty whether the termination provided with a tapered dielectric body will provide a good match when completed. If an axial bore is provided it is obvious that such a bore of uniform diameter may be provided by a very simple operation, which may also be a turning operation, and a female taper as illustrated in Figure 6 may also be made upon a lathe. Thus the need for a variety of machines is eliminated.

I have obtained successful results with devices embodying my invention of from ¼ in. to 6 or more inches in length. Thus the compactness of my device, and the saving in space effected over prior art devices will be apparent.

Termination members embodying my invention may, if desired, be made by an electro-forming process following the turning operations described above. Thus in Figure 7 I have illustrated a termination member made by starting with a dielectric cylinder 60, on which is deposited a layer of carbon 62, on which in turn is deposited a layer 64 of a conductive material such, for example, as copper or silver or iron. The carbon may be painted or otherwise applied onto the surface of the cylinder 60, and the coating 64 of copper, silver or iron may be deposited electrolytically, preferably to the thickness of about 1/16 of an inch, after which the device is put on a lathe and the metal deposit turned down to the exact thickness desired which may be on the order of 1/32 of an inch.

Alternatively the layers provided successively around the surface of the dielectric cylinder may be applied by painting as for example by spray-painting.

Electro-forming is still a tedious process but devices embodying my invention of a circular wave guide having therein a cylinder of dielectric with plane ends may be formed in this manner far more simply and with less expense than would be required for the electro-forming of prior art devices intended for the same purposes.

It will thus be seen that there has been provided by this invention apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. A rectangular to circular waveguide junction comprising, an airfilled rectangular waveguide section of other than an odd integral of quarter wavelengths long for supporting microwave energy only in the dominant mode, a circular waveguide section having a body of solid dielectric material therein for supporting microwave energy only in the dominant mode, means for directly connecting said waveguide sections in end-to-end abutting relationship, said body of solid dielectric material substantially filling said circular waveguide section with one end thereof substantially coextensive with the end of said circular waveguide section adjacent said rectangular waveguide section.

2. A rectangular to circular waveguide junction comprising, an airfilled rectangular waveguide section of other than an odd integral of quarter wavelengths long for supporting microwave energy only in the dominant mode, a coupling flange at one end thereof, a circular waveguide section having a body of solid dielectric material therein for supporting microwave energy only in the dominant mode, a coupling flange at one end thereof, said flanges being directly connected together with said waveguide sections in longitudinal axial alignment, said body of solid dielectric material substantially filling said circular waveguide section with one end thereof substantially coextensive with the end of said circular waveguide section adjacent said rectangular waveguide section.

3. A rectangular to circular waveguide junction comprising, an airfilled rectangular waveguide section of other than an odd integral of quarter wavelengths long for supporting microwave energy only in the dominant mode, a circular waveguide section having a body of solid dielectric material therein for supporting microwave energy only in the dominant mode, means for directly connecting said waveguide sections in end-to-end abutting relationship, said body of solid dielectric material substantially filling said circular waveguide section with one end thereof recessed from the end of said circular waveguide section adjacent said rectangular waveguide section by a distance of from 1/1000 to 1/32 of an inch.

4. A rectangular to circular waveguide junction comprising, an airfilled rectangular waveguide section of other than an integral of quarter wavelengths long for supporting microwave energy only in the dominant mode, a coupling flange at one end thereof, a circular waveguide section having a body of solid dielectric material therein for supporting microwave energy only in the dominant mode, a coupling flange at one end thereof, said flanges being directly connected together with said waveguide sections in longitudinal axial alignment, said body of solid dielectric material substantially filling said circular waveguide section with one end thereof recessed from the end of said circular waveguide section adjacent said rectangular waveguide section by a distance of from 1/1000 to 1/32 of a inch.

References Cited in the file of this patent

UNITED STATES PATENTS

| | | |
|---|---|---|
| 2,197,123 | King | Apr. 16, 1940 |
| 2,432,093 | Fox | Dec. 9, 1947 |
| 2,495,415 | Marshall | Jan. 24, 1950 |
| 2,503,549 | Fox | Apr. 11, 1950 |
| 2,509,196 | Cork | May 23, 1950 |
| 2,511,610 | Wheeler | June 13, 1950 |
| 2,546,840 | Tyrrell | Mar. 27, 1951 |
| 2,557,110 | Jaynes | June 19, 1951 |
| 2,576,186 | Malter | Nov. 27, 1951 |
| 2,603,709 | Bowen | July 15, 1952 |

OTHER REFERENCES

Publication I, Ragan: Microwave Transmission Circuits, vol. 9, M. I. T. Rad. Lab. Series, Pub. McGraw-Hill, 1948; copy in Patent Office Library; pages 369 and 676.